Dec. 26, 1967  C. A. BOLEZ ET AL  3,359,744
HYDROGEN PURIFICATION SYSTEM WITH SEPARATED VAPOR AND
LIQUID MIXED TO PROVIDE A HEAT EXCHANGE MEDIUM
Filed June 16, 1965  2 Sheets-Sheet 1

INVENTORS.
Carl A. Bolez &
John A. Pryor
BY
ATTORNEY.

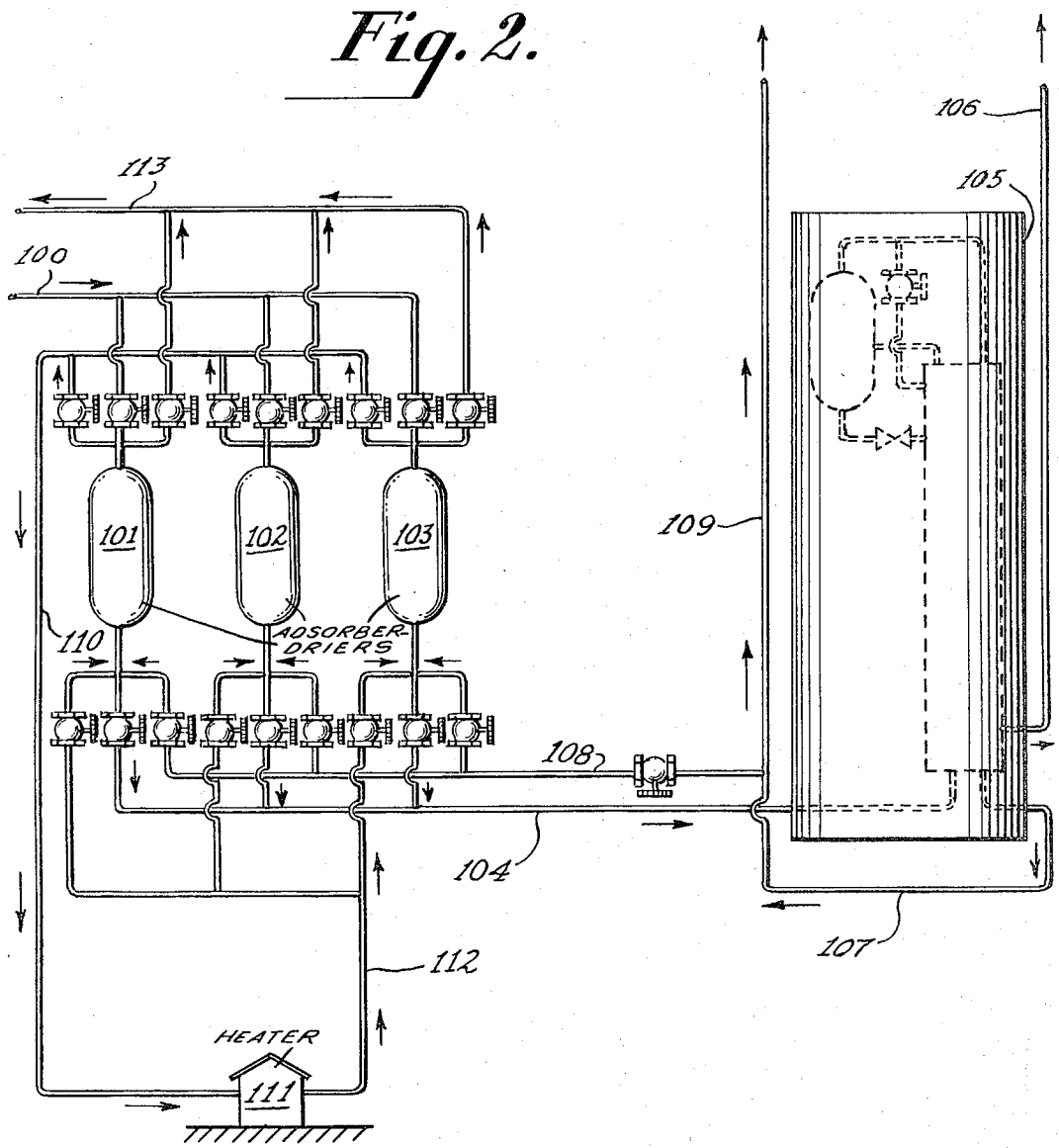

United States Patent Office 3,359,744
Patented Dec. 26, 1967

3,359,744
HYDROGEN PURIFICATION SYSTEM WITH SEPARATED VAPOR AND LIQUID MIXED TO PROVIDE A HEAT EXCHANGE MEDIUM
Carl A. Bolez, Allentown, and John A. Pryor, Emmaus, Pa., assignors to Air Products and Chemicals, Inc., Philadelphia, Pa., a corporation of Delaware
Filed June 16, 1965, Ser. No. 464,446
7 Claims. (Cl. 62—36)

ABSTRACT OF THE DISCLOSURE

A hydrogen purification system for removing hydrocarbons from a crude hydrogen stream is disclosed wherein a portion of the purified hydrogen stream is mixed with condensed and separated hydrocarbons and the mixture is used to refrigerate and condense the incoming crude hydrogen to obtain increased purity of the product hydrogen. Also, the system utilizes either product hydrogen or separated hydrocarbons to regenerate and cool a plurality of switching adsorbers which remove water and other impurities prior to condensation of the crude hydrogen stream.

---

Figure 1:
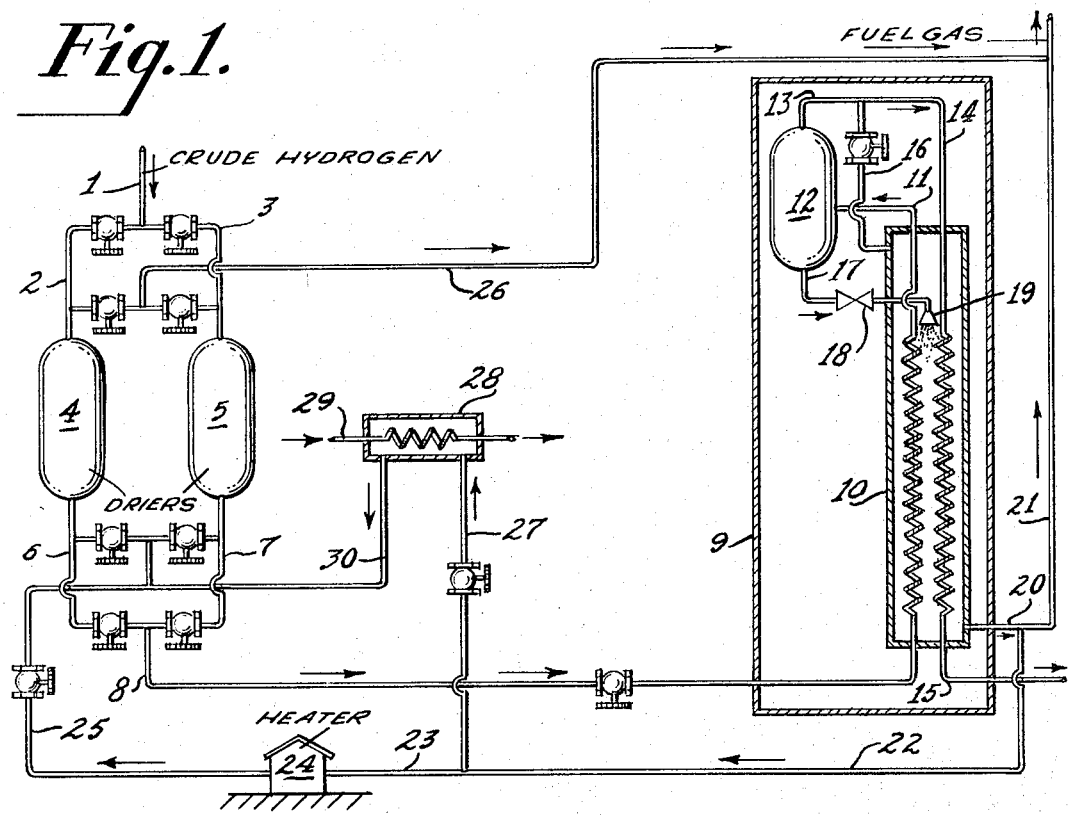

The present invention relates to the purification of hydrogen and more particularly to the removal of hydrocarbon impurities from a hydrogen-rich gas stream.

Many modern industrial chemical processes require substantial amounts of hydrogen in relatively pure form. In such processes, hydrogen, mixed and/or diluted with other gases, such as normally gaseous hydrocarbons, is often obtained as a by-product. While this impure hydrogen may be burned as fuel, it is desirable to recover the hydrogen in a more concentrated and usable form that may be recycled back through the system.

In the past, selective adsorption of hydrogen on an adsorbent material, such as molybdenum oxide on alumina, has been suggested for the separation of hydrogen and hydrocarbons. Other methods previously suggested for separating hydrogen from gaseous hydrocarbons have included an operation for forming the solid hydrate of the hydrocarbons and then separating the solids from the remaining gas. Such methods, however, have not been satisfactory on a commercial basis for the separation of hydrogen from hydrogen-rich gaseous streams containing methane.

An auto-refrigeration method has now been found for effectively separating gaseous hydrocarbons, including methane, from a crude hydrogen stream containing such hydrocarbons. In accordance with this invention, an impure hydrogen stream containing said gaseous hydrocarbons is dried, passed through an autogenous heat exchanger where it is cooled to a temperature sufficient to liquefy at least part of the hydrocarbons and separated into a gas stream and a liquid stream. Hydrogen, having a purity of at least 85% and generally greater than 90%, is recovered as the gas stream. The liquid stream, on the other hand, is expanded and utilized to cool the impure hydrogen stream in the autogenous heat exchanger system.

The invention is clarified by reference to the following description read in connection with the drawings which diagrammatically illustrate preferred embodiments. Since the function and operation of valves are well known, they have not been numerically identified in the drawings.

In FIGURE 1, a crude hydrogen stream (line 1) at approximately 810 p.s.i.a. and 100° F. having substantially the following composition:

| | Mol percent |
|---|---|
| Hydrogen | 59 |
| Methane | 37 |
| Ethane | 3 |
| Propane and heavier hydrocarbons | 1 | is passed through line 2 into a drier 4 filled with Type 4A Molecular Sieve for the removal of trace amounts of moisture.

The dried gas (line 6) is passed directly through line 8 into a hydrocarbon rejection unit 9 which contains an autogenous heat exchanger 10. This gas has essentially the same composition and temperature as the crude hydrogen stream in line 1 but as a result of being passed through the drier its pressure has been reduced to about 805 p.s.i.a. In heat exchanger 10, the dried gas is cooled to a temperature of approximately −235° F. At this temperature, essentially all of the ethane, propane and heavier hydrocarbons condense as well as a major portion of the methane present in the gaseous stream. The resulting two phase mixture in line 11 is sent to liquid separator 12 for separation of the two phases. The recovered gaseous phase (containing about 91% hydrogen) is passed through lines 13 and 14 and heat exchanger 10 to cool incoming dried gas in line 8 and leaves the heat exchanger as product hydrogen in line 15.

Condensate from liquid separator 12 is passed through line 17 and a Joule-Thomson expansion device 18 which lowers its pressure to about 65 p.s.i.a. and its temperature to about −245° F. Condensate, at this low temperature, is then passed back through the shell of the autogenous heat exchanger 10 preferably by injection into the shell from one or more spray heads 19. Warmed hydrocarbon fluid collected from the bottom of heat exchanger 10 is removed through line 20. A portion of this gaseous hydrocarbon fluid is conveyed by means of line 21 for rejection, recovery or use as fuel gas.

The remaining portion of gaseous hydrocarbon fluid is passed through lines 22, 23, and 25 for reactivation of the driers. This portion is heated to a temperature of about 600° F. by means of at least one heater 24 before passing through drier 5 and line 26. Thus, reactivation flow in the driers is opposite to the normal process flow. After regeneration or reactivation of the drier is complete, it is cooled by diverting the gaseous hydrocarbon fluid in line 22 through line 27 and cooler 28. Water from line 29 is employed to lower the temperature of the gaseous hydrocarbon fluid in line 30 to a temperature near the normal operating temperature of the drier being reactivated. Such cooling lessens the heat load on the overall system when the driers are switched.

By reversing the valves, to allow the crude hydrogen stream to flow through lines 3 and 7, the driers can be alternated periodically. Generally, the driers are reactivated on an 8-hour cycle but the interval for each cycle depends on operating variables such as the desiccant utilized, the height of the desiccant bed and the nature of the gaseous contaminants.

When higher purity product hydrogen is required and recovery of all of the hydrogen is not important, a portion of the purified hydrogen in line 13 may be injected through by-pass line 16 into the shell of autogenous heat exchanger 10. This injected hydrogen reduces the partial pressure of the hydrocarbons introduced into the heat exchanger shell and consequently the boiling point of said hydrocarbons. The overall effect is a cooling of the dried gas (from line 8) to a lower temperature in autogenous heat exchanger 10 and concomitantly a purer hydrogen product. While the proportion of purified hydrogen passed through line 16 for this purpose may be as great as 50% or even higher, generally the amount of purified hydrogen so diverted will range from 1 to 30%.

The improvement of hydrogen purity obtained by injecting a portion of enriched hydrogen into the heat exchanger shell in addition to the condensed hydrocarbon stream can be seen in the following table. In each instance, the initial feed compositions were identical.

|  | No $H_2$ Injection | $H_2$ Injection |
|---|---|---|
| Product $H_2$ Composition (Mol Percent) | 91.06 $H_2$ 8.94 $CH_4$ | 94.90 $H_2$ 5.10 $CH_4$ |
| Hydrogen Recovery (Percent) | 96.26 | 90.82 |
| Approx. Final Feed Temp. (° F.) | −230 | −255 |

It will be noted that substantially improved product hydrogen purity has been obtained by sacrificing total hydrogen recovery. It will further be noted that hydrogen injection lowered the final feed temperature by twenty-five Fahrenheit degrees.

FIGURE 2, a modification of the installation shown in FIGURE 1, utilizes enriched hydrogen instead of fuel gas to purge and reactivate the absorber-driers. In this embodiment, the feed stream (line 100) having the following approximate composition:

| | Mol percent |
|---|---|
| Hydrogen | 55.0 |
| Methane | 40.5 |
| Ethane | 3.4 |
| Benzene+heavier | 0.9 | as well as minor amounts of other materials including toluene, xylene and water is introduced to one of three adsorbers (101, 102 and 103). These adsorbers contain two beds, viz., a bed of carbon for removal of benzene, toluene and xylene (BTX) and a bed of activated alumina for removal of water.

The feed gas leaving the adsorbers (line 104) is passed to a hydrocarbon rejection unit 105 which is identical with the hydrocarbon rejection unit 9 of FIGURE 1. However, the gaseous hydrocarbon stream (line 106) from hydrocarbon rejection unit 105 is not employed to reactivate the adsorbers. Instead, a portion of the enriched hydrogen stream 107, containing approximately 90% hydrogen is recycled through line 108 for this purpose. The remaining portion of the enriched and purified hydrogen stream is passed through line 109 for recycle to the overall system.

While adsorber 101 is in service, enriched hydrogen gas passes upward through adsorber 102 to cool the adsorber to approximately 40° F. This same enriched hydrogen stream is then transmitted through line 110, heater 111 and line 112 to adsorber 103 for removal of adsorbed BTX and water. BTX, recovered from the adsorbers, may then be passed through line 113 for reuturn to the overall system.

When adsorber 103 is sufficiently reactivated, the feed gas stream 100 is diverted to adsorber 102. Cool enriched hydrogen gas (line 108) is simultaneously diverted to adsorber 103 as warm enriched hydrogen (line 112) commences to reactivate adsorber 101. This sequence is followed to reactivate each of the adsorbers on a suitable cycle of approximately four hours.

Figure 3:
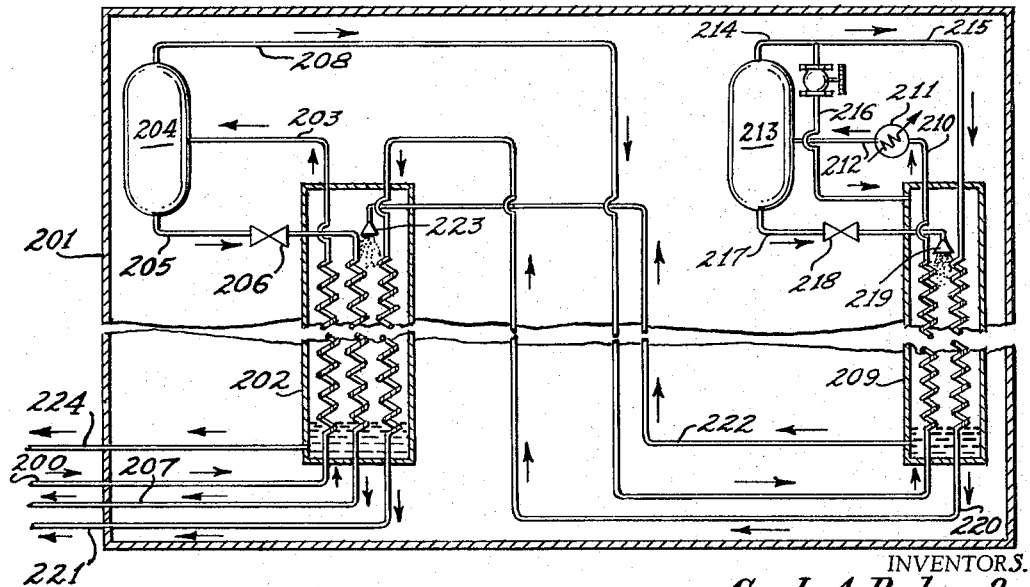

It is often advantageous to employ two or more separators in the hydrocarbon rejection unit. An embodiment having two separators is shown in FIGURE 3.

In this embodiment, dried gas having the following composition:

| | Mol percent |
|---|---|
| $H_2$ | 30.00 |
| $CH_4$ | 65.34 |
| $C_2H_6$ | 3.33 |
| $C_2H_4$ | 1.33 | is passed through line 200 to hydrocarbon rejection unit 201. This gas is cooled in an autogenous heat exchanger 202 and then sent along line 203 into liquid separator 204 where the temperature is approximately −200° F.

Liquid condensate from the separator is passed through line 205 and expanded in a fluid expansion device 206 before it is passed through heat exchanger 202 into line 207.

The gaseous phase recovered from separator 204 is sent along line 208 to a second heat exchanger 209. After passing through line 210 and nitrogen evaporator 211, this material is then introduced by means of line 212 into a second separator 213 where the temperature is approximately −280° F.

Once again two phases are obtained. The gaseous phase (product hydrogen) is passed along lines 214 and 215 back through heat exchanger 209. The product hydrogen is then sent along line 220 through heat exchanger 202 and finally recovered in line 221. This product hydrogen stream contains 95.93 mol percent hydrogen and 4.07 mol percent methane. Total hydrogen recovery is 96.88%. Additional hydrogen purity is obtained by following the procedure previously mentioned wherein a portion of the purified hydrogen is injected through by-pass line 216 into the shell of heat exchanger 209.

Liquid condensate (reject hydrocarbons) is passed from separator 213 through line 217 and fluid expansion device 218 into the shell of heat exchanger 209. Preferably, one or more nozzles (219) are employed to inject the hydrocarbons into this exchanger. The reject hydrocarbons may then be recovered (by means not shown) or transmitted through line 222 and injected into the shell of heat exchanger 202 by means of nozzle 223. Said reject hydrocarbons are recovered from heat exchanger 202 by means of line 224.

Since the temperature of separator 204 is warmer than separator 213, reject hydrocarbons from separator 204 can be flashed to a higher pressure than the hydrocarbons leaving separator 213. Thus savings in compression costs can be realized if reject hydrocarbons at elevated pressure are desired.

Two separate heat exchangers have been shown in FIGURE 3 to facilitate an understanding of the overall operation. However, these exchangers could be placed in a common housing having concentric or partitioned sections.

In addition to a more efficient cooling system, the embodiment of FIGURE 3 permits the production of useful by-products. For instance, the reject hydrocarbon stream from the second separator is 99.16 mol percent methane. A relatively slight modification of the described system (e.g., installation of a separator at the cold end of the second heat exchanger down-stream from the fluid expansion device) permits recovery of 99.8% pure methane by-product.

The illustrated embodiments find particular application to systems designed for the dealkylation of charge stocks containing toluene, xylene and/or higher benzene homologs to high-purity benzene. Notwithstanding, the invention is applicable to any system in which it is desirable to separate gaseous hydrocarbons from an impure or crude hydrogen stream containing at least 30% hydrogen.

The term desiccant is employed herein and in the claims to mean a material having the property of removing substances from gaseous streams which could cause plugging of the hydrocarbon rejection unit. Thus it is intended that the term desiccant include materials which remove substances by either adsorption or absorption.

The types of desiccants which may be employed are well known to those skilled in the art. For example, silica gel and activated alumina are advantageous in drying operations for the removal of water. Naturally occurring and synthetic zeolites, however, are also preferred desiccants. The desiccant may be packed in a uniform or continuous manner thoughout each vessel or, as in the case of FIGURE 2, such vessels may be packed with a number of different desiccant materials, preferably arranged in layers or sections.

While the driers and/or adsorbent vessels have internal filters to prevent carryover of desiccant, it is possible to insert after-filters in the system to assure the removal of any solid material which may be carried over.

Substances in the hydrogen-rich gaseous feed material which are detrimental to the particular desiccant employed are, of course, removed by suitable traps, filters, etc. prior to the introduction of said feed material in the driers and/or adsorbent vessels. For example, where considerable moisture is present in the hydrogen-rich gaseous feed it is desirable to employ a precooler to condense out such moisture before the feed gas is sent through the dried vessel.

Heaters and coolers, required for operation in accordance with the disclosed operation may be of any conventional form. Accordingly, the heaters may be electric, gas fired or steam heated. Conventional coolants, such as water, may be employed in the coolers depending on their availability. Additionally, the heater exchange characteristics of either a feed or product material may be utilized to cool or heat one or more of the process streams.

Joule-Thomson expansion, as employed herein, is used to describe an operation in which cooling is obtained by dropping the pressure of a fluid. While some pressure drop occurs due to friction losses in piping, significant cooling is obtained by installing a throttling device such as a valve or orifice in the piping. The degree of cooling by expansion depends on the pressure drop as well as the temperature of the fluid before it is expanded. Within limits, maximum cooling is obtained by having as large a pressure drop as possible and by cooling the fluid as much as possible before expansion. Supplemental cooling can be obtained in the disclosed operation, if desired, by employing additional Joule-Thomson expansion devices in the hydrocarbon rejection unit.

Obviously, many modifications and variations of the invention as hereinabove set forth may be made without departing from the spirit and scope of the invention and therefore, only such limitations should be imposed as are indicated in the appended claims.

What is claimed is:

1. A hydrogen purification system for separating gaseous hydrocarbons from a crude hydrogen stream comprising: heat exchanger having first, second and third passages in heat exchange relationship, means for introducing said crude hydrogen stream into said first heat exchanger passage for cooling said crude hydrogen stream and condensing the major portion of said hydrocarbons phase separator means connected to said first heat exchanger passage for separating said condensed hydrocarbons from the resulting hydrogen enriched gaseous stream, passage means for injecting said condensed hydrocarbons into said second heat exchanger passage, expansion means in said last recited passage means for expanding said condensed hydrocarbons to a lower temperature before injection thereof into said second heat exchanger passage wherein said low temperature condensed hydrocarbons are vaporized in cooling said crude stream in said first heat exchanger passage, passage means for passing the major portion of said enriched hydrogen stream from said separator through third heat exchanger passage to warm said enriched hydrogen stream, passage means for withdrawing warmed enriched hydrogen as a product stream, and by-pass passage means for passing a minor portion of said enriched hydrogen stream from said separator through said second heat exchanger passage for reducing the partial pressure and lowering the temperature of the hydrocarbons in said second passage thereby producing greater hydrocarbon condensation from the crude hydrogen stream in the first heat exchanger passage and higher product hydrogen purity.

2. The hydrogen purification system as claimed in claim 1 wherein said by-pass passage includes variable flow control means for selectively varying the amount of enriched hydrogen passed into said second heat exchanger passage thereby selectively controlling the product hydrogen purity.

3. A hydrogen purification system for separating gaseous hydrocarbons and minor impurities from a crude hydrogen stream comprising: a pair of switching adsorbers for removing said minor impurities from said crude hydrogen stream, a heat exchanger having first, second and third passages in heat exchange relationship, means for introducing said crude hydrogen stream from said adsorbers into said first heat exchanger passage for cooling said crude hydrogen stream and condensing the major portion of said hydrocarbons, phase separator means connected to said first heat exchanger passage for separating said condensed hydrocarbons from the resulting hydrogen enriched gaseous stream, passage means for inecting said condensed hydrocarbons into said second heat exchanger passage, expansion means in said last recited passage means for expanding said condensed hydrocarbons to a lower temperature before injection thereof into said second heat exchanger passage wherein said low temperature condensed hydrocarbons are vaporized in cooling said crude stream in said first heat exchanger passage, passage means for passing the major portion of said enriched hydrogen stream from said separator through said third heat exchanger passage to warm said enriched hydrogen stream, passage means for withdrawing warmed enriched hydrogen as a product stream, passage means including switching valve means for sequentially passing a portion of said enriched hydrogen product stream through alternate adsorbers to reactivate and cool said adsorbers, said last recited passage means including heater means for heating said portion of said enriched hydrogen stream prior to passage through an adsorber under reactivation and by-pass passage means for passing a minor portion of said enriched hydrogen stream from said separator through said second heat exchanger passage for reducing the partial pressure and lowering the temperature of the hydrocarbons in said second passage thereby producing greater hydrocarbon condensation from the crude hydrogen stream in the first heat exchanger passage and higher product hydrogen purity.

4. The hydrogen purification system as claimed in claim 3 wherein said by-pass passage includes variable flow control means for selectively varying the amount of enriched hydrogen passed into said second heat exchanger passage thereby selectively controlling the product hydrogen purity.

5. A hydrogen purification system for separating gaseous hydrocarbons and minor impurities from a crude hydrogen stream comprising: a pair of switching adsorbers for removing said minor impurities from said crude hydrogen stream, a heat exchanger having first, second and third passages in heat exchange relationship, means for introducing said crude hydrogen stream from said adsorbers into said first heat exchanger passage for cooling said crude hydrogen stream and condensing the major portion of said hydrocarbons, phase separator means connected to said first heat exchanger passage for separating said condensed hydrocarbons from the resulting hydrogen enriched gaseous stream, passage means for injecting said condensed hydrocarbons into said second heat exchanger passage, expansion means in said last recited passage means for expanding said condensed hydrocarbons to a lower temperature before injection thereof into said second heat exchanger passage wherein said low temperature condensed hydrocarbons are vaporized in cooling said crude stream in said first heat exchanger passage, passage means for passing the major portion of said enriched hydrogen stream from said separator through said third heat exchanger passage to warm said enriched hydrogen stream, passage means for withdrawing warmed enriched hydrogen as a product stream, passage means including switching valve means for sequentially passing a portion of said vaporized hydrocarbons from said second heat exchanger passage through alternate adsorbers to reactivate and cool said adsorbers, said last recited passage means including heater means to heat said vaporized hydrocarbons before passage through an adsorber under reactivation and cooling means for cooling said vaporized hydrocarbons prior to passage through a reactivated adsorber.

6. The hydrogen purification system as claimed in claim 5 further including by-pass passage means for passing a minor portion of said enriched hydrogen stream from said separator through said second heat exchanger passage for reducing the partial pressure and lowering the temperature of the hydrocarbons in said second passage thereby producing greater hydrocarbon condensation and higher product hydrogen purity.

7. The hydrogen purification system as claimed in claim 6 wherein said by-pass passage includes variable flow control means for selectively varying the amount of enriched hydrogen passed into said second heat exchanger passage thereby selectively controlling the product hydrogen purity.

References Cited

UNITED STATES PATENTS

| 1,913,805 | 6/1933 | Hausen | 62—23 X |
| 2,936,593 | 5/1960 | Grunberg. | |
| 2,973,834 | 3/1961 | Cicalese. | |
| 3,011,589 | 12/1961 | Meyer. | |
| 3,107,992 | 10/1963 | Sellmaier | 62—18 |
| 3,119,677 | 1/1964 | Moon et al. | 62—23 |
| 1,020,102 | 3/1912 | Von Linde | 62—23 |
| 2,258,015 | 10/1941 | Keith et al. | 62—18 |
| 2,503,939 | 4/1950 | De Baufre | 62—18 X |
| 3,023,841 | 10/1957 | Milton et al. | 62—18 |

FOREIGN PATENTS 951,875 11/1956 Germany.

NORMAN YUDKOFF, *Primary Examiner.*

W. PRETKA, *Assistant Examiner.*

Disclaimer 3,359,744.—*Carl A. Bolez*, Allentown, and *John A. Pryor*, Emmaus, Pa. HYDROGEN PURIFICATION SYSTEM WITH SEPARATED VAPOR AND LIQUID MIXED TO PROVIDE A HEAT EXCHANGE MEDIUM. Patent dated Dec. 26, 1967. Disclaimer filed Feb. 17, 1971, by the assignee, *Air Products and Chemicals, Inc.*

Hereby enters this disclaimer to claims 1 and 2 of said patent.

[*Official Gazette June 29, 1971.*]